United States Patent [19]
Engert et al.

[11] 3,785,586
[45] Jan. 15, 1974

[54] FRICTION WHEEL DRIVE ESPECIALLY FOR CASSETTE MAGNETIC TAPE RECORDERS

[76] Inventors: Heinz Engert; Heinz-Dieter Engert, both of Dyroffstr. 4C, Munich Untermenzing, Germany

[22] Filed: Jan. 28, 1972

[21] Appl. No.: 221,692

[52] U.S. Cl. .................................. 242/201, 274/4 D
[51] Int. Cl. ......................... B11b 15/32, G03b 1/04
[58] Field of Search ......................................
242/201–210; 274/4 D, 11 D; 179/100.2 R, 100.2 C, 100.2 S

[56] References Cited
UNITED STATES PATENTS

| | | | |
|---|---|---|---|
| 3,073,540 | 1/1963 | Guest | 242/201 |
| 3,642,230 | 2/1972 | Fleming | 242/201 |
| 3,684,212 | 8/1972 | Engert | 242/201 |

*Primary Examiner*—Leonard D. Christian
*Attorney*—John J. McGlew et al.

[57] ABSTRACT

A flywheel is driven from a motor output shaft by resilient power transmission means, and has a smaller diameter sleeve or hub rotatable therewith. A shaft secured to the flywheel extends concentrically through the hub or sleeve, and has a diameter substantially less than the internal diameter of the hub. An additional sleeve is telescoped over this shaft, and has a cutaway portion therein at a distance from the flywheel equal to the axial length of the first-mentioned hub, this cutaway exposing the shaft. The flywheel is rotatably mounted on a setting lever which is operable to set positions by means of a manually displaceable cam wheel acting through a spring. In one position of the parts, the hub engages a counterwheel driving a further friction wheel associated with a shaft mounting a rewind pulley and, in another position of the lever, a friction wheel secured to a shaft associated with the forward drive reel extends into the cutaway portion to directly engage the shaft secured to the flywheel, for low speed forward movement of the tape.

7 Claims, 6 Drawing Figures

PATENTED JAN 15 1974 3,785,586
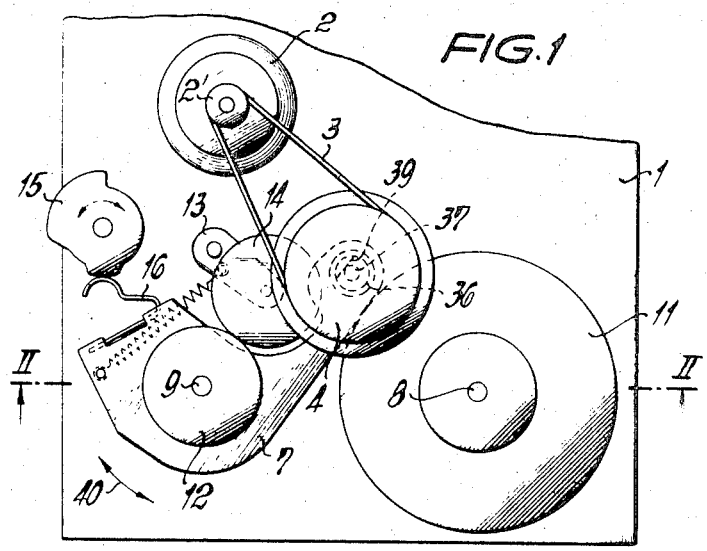
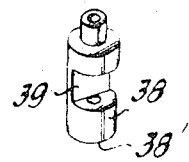
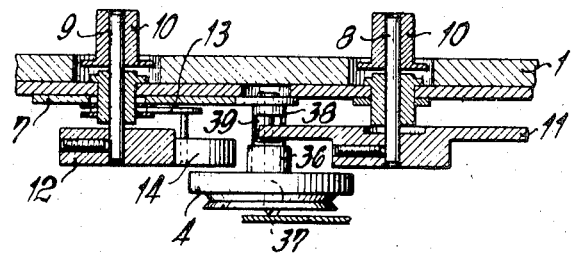
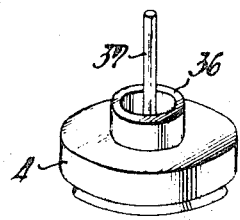
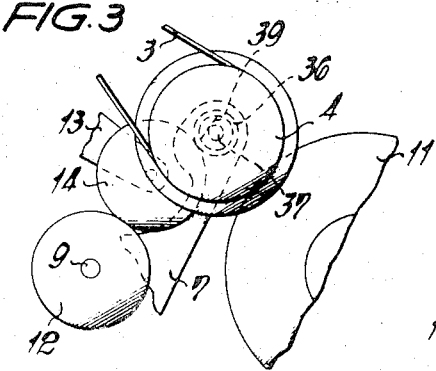
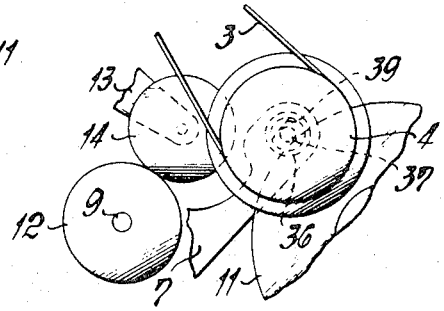

FRICTION WHEEL DRIVE ESPECIALLY FOR CASSETTE MAGNETIC TAPE RECORDERS

CROSS REFERENCE TO RELATED APPLICATION

This application discloses an improvement on the friction wheel drive for magnetic tape recorder shafts disclosed in Tupaj et al, U.S. Pat. application, Ser. No. 106,780, filed Jan. 15, 1971 for "MAGNETIC TAPE RECORDER" now U.S. Pat. No. 3,718,777.

FIELD OF THE INVENTION

This invention relates to friction wheel drives especially for cassette magnetic tape recorders and, more particularly, to an improved and simplified friction wheel drive for this purpose.

BACKGROUND OF THE INVENTION

In the friction wheel drive shown in application Ser. No. 106,780 now U.S. Pat. No. 3,718,777, the belt pulley, acting as the flywheel mass, is combined with a friction wheel to form a unit. A sleeve concentrically fitted in and rotatable with the belt pulley serves as the other friction wheel. A pin fixed to a setting lever is engaged in the axial bore of the sleeve to serve as an axle for rotation of the belt pulley.

SUMMARY OF THE INVENTION

The objective of the invention is to improve the synchronization of such a friction wheel drive, and to further develop the friction wheel drive, for cassette magnetic tape recorders of the type to which such a friction wheel drive is applicable. In accordance with the invention, the belt pulley is supported and held, through the medium of a shaft that is resistant to motion of the setting lever, by a bearing sleeve which is secured to the setting lever. This bearing sleeve, at an axial spacing therealong equal to the axial length of a friction sleeve or hub on the belt pulley, is formed with a cutaway portion exposing a section of the shaft. The bearing sleeve is telescoped in this hub. The section of the shaft thus can function as a friction wheel which can be engaged with the aforementioned counterwheel.

With the invention arrangement, eccentric dislocation between the driving friction wheels, or between these and the belt pulley, and bearing play between the same and their bearings, is eliminated. The shaft fixedly connected with the belt pulley also supports the sleeve secured to the belt pulley and constituting the other friction wheel, concentrically with the belt pulley and without play. Due to the elimination of eccentricities between the drive elements, improvement of synchronization is obtained as well as a simplified design of the friction wheel drive.

The direct interaction between the shaft and the counterwheel, in the area of the cutaway portion of the bearing sleeve, further provides a short and compact design of the friction wheel drive and wherein the section of the shaft, serving as a friction wheel, is securely supported by the bearing sleeve sections on either side of the cutaway. Thus, eccentric errors which may be caused by the contact pressure can be avoided. Finally, the bearing sleeve provides for a large support area for the belt pulley, for the purpose of achieving a small pressure per unit area, and further provides a low friction drive which is easy on the material.

In accordance with the invention, the stability of the belt pulley on the bearing sleeve is supported by having it concentrically embraced, over a portion of its length, by an annular friction wheel forming a unit with the belt pulley or even integral therewith. The preferred material for the bearing sleeve is a suitable bearing material, preferably a metallic bearing material such as brass or the like. To support the bearing sleeve in the area of coaxial dislocation at the setting lever, the bearing sleeve may be connected to the latter by pinching, cementing, or similar treatment. It will be understood that the bearing sleeve itself can have a relatively large diameter, so that other materials, such as plastic, can be used to form the bearing sleeve.

An object of the invention is to provide an improved friction wheel drive for cassette-type magnetic tape recorders.

Another object of the invention is to provide such a friction wheel drive providing improved synchronization of operation of the magnetic tape recorder.

A further object of the invention is to provide such a friction wheel drive in which eccentric dislocation and bearing play between the various wheels and between these wheels and their bearings is eliminated.

Another object of the invention is to provide such a friction wheel drive in which the stability of the belt pulley with respect to its rotatable mounting on the setting lever is improved.

For an understanding of the principles of the invention, reference is made to the following description of a typical embodiment thereof as illustrated in the accompanying drawing.

BRIEF DESCRIPTION OF THE DRAWING

In the drawing:

FIG. 1 is a somewhat schematic top plan view of a cassette-type magnetic tape recorder having a friction wheel drive embodying the invention;

FIG. 2 is a sectional view taken along the line II—II of FIG. 1;

FIG. 3 is a bottom plan view of a part of the friction wheel drive in one of the switching positions of the setting lever;

FIG. 4 is a view similar to FIG. 3 but illustrating the drive in another switching position of the setting lever;

FIG. 5 is a perspective view of a bearing sleeve in accordance with the invention;

FIG. 6 is a perspective view of a belt pulley with a friction wheel and a shaft, in accordance with the present invention.

DESCRIPTION OF THE PREFERRED EMBODIMENT

Referring to FIGS. 1 and 2, a housing 1, of a cassette type magnetic tape recorder, contains a drive motor 2 having an output pulley 2' rotating, through a belt drive 3, a belt pulley 4 serving as the flywheel mass. Housing 1 additionally mounts a reel carrier shaft 8 for the magnetic tape reel effecting forward motion of the tape, but which reel is not illustrated, and a reel carrier shaft 9 for the tape reel effecting rewinding of the tape. Reel carrier shafts 8 and 9, as can be seen particularly in FIG. 2, are provided with reel connecting portions 10 at their ends projecting from housing 1 in order to allow mounting thereon of the magnetic tape reels. Respective counterwheels 11 and 12 are mounted on reel carrier shafts 8 and 9. Counterwheel 12 cooperates with an intermediate wheel 14 which is swingably supported in housing 1 by means of a lever 13.

In addition to the aforementioned elements, housing 1 receives a setting lever 7 which is pivotal about the axis of reel carrier shaft 9, setting lever 7 rotatably supporting belt pulley 4 and being switchable by a manually rotatable cam wheel 15 cooperable with a spring 17 which is resistant to the setting lever movement. In accordance with the positions of cam wheel 15, setting lever 7 moves belt pulley 4 from its central position, as indicated by arrow 40, into one or the other of two end positions.

In accordance with the invention, belt pulley 4 is either fixedly secured with a sleeve-shaped friction wheel 36, or alternatively wheel 4 and wheel 36 may be made integral with each other. In one end position of setting lever 7, as shown in FIG. 3, friction wheel 36 engages intermediate wheel 14. Belt pulley 4 is supported by a torsion-resistant shaft 37 which, in its capacity as a drive member, can be put directly into motion together with counterwheel 11 in the other position of the setting lever. To support belt pulley 4 and drive members 36, 37, shaft 37 is engaged in the bearing sleeve 38 which is supported by, and fixedly mounted on, setting lever 7. Sleeve bearing 38, in the particular embodiment under discussion, is formed of a metallic bearing material. At a distance from its end equal to its axial length a friction wheel 36, and at the level of counterwheel 11, a section 39 is cut away from bearing sleeve 38 having shaft 37 extending therethrough, thus exposing a portion of shaft 37.

The torque applied to belt pulley 4 by drive motor 2 thus can be utilized for the forward movement of the tape at a high reduction gear ratio by engaging shaft 37 with counterwheel 11, as shown in FIG. 4. In the other end position of setting lever 7, the torque of belt pulley 4 acts through friction wheel 36 upon intermediate wheel 14 which in turn acts upon counterwheel 9, to rewind the magnetic tape at a higher speed. This position of the parts is shown in FIG. 3. Referring to FIG. 5, this figure illustrates that, in order to ensure free interaction between shaft 37 and counterwheel 11, cutaway section 39 exposes the entire periphery of shaft 37. The internal diameter of sleeve-shaped friction wheel 36 is selected so that it rotates with only little play around sleeve 38, in order to transmit any tilting force, acting upon belt pully 4, to bearing sleeve 38. It will be clear that sleeve 38 can have a large area end face 38', in order to keep the contact pressure, between belt pulley 4 and bearing sleeve 38, at a low value. In a further embodiment of the invention, friction wheel 36 also can be designed as a solid body and rest upon bearing sleeve 38 so as to support belt pulley 4 at setting lever 7.

While a specific embodiment of the invention has been described and shown in detail to illustrate the application of the principles of the invention, it will be understood that the invention may be embodied otherwise without departing from such principles.

What is claimed is:

1. In a magnetic tape recorder having reel carrier shafts, a driving motor, and a setting lever having stop, forward and rewind settings, and further having a friction wheel drive including a belt pulley, serving as a flywheel mass and rotatably mounted on the setting lever, a belt drive connecting the motor to the belt pulley, respective counterwheels on the reel carrier shafts, an intermediate wheel engageable with one counterwheel, and friction wheel means rotatable with the belt pulley and selectably engageable with either the other counterwheel or the intermediate wheel: the improvement comprising, in combination, a bearing sleeve secured to said setting lever and resistant to the setting lever movement; and a torsion-resistant shaft rotatably engaged in said bearing sleeve and secured to said rotatable belt pulley for rotation therewith; said bearing sleeve having a cutaway portion intermediate its ends at substantially the plane of rotation of said other counterwheel; whereby, upon movement of said setting lever to an end position said other counterwheel is engageable with said torsion-resistant shaft acting as a friction wheel and included in said friction wheel means.

2. In a magnetic tape recorder, the improvement claimed in claim 1, including an annular friction wheel secured to rotate with said belt pulley and included in said friction wheel means; said annular friction wheel being engageable with said inter-mediate wheel, and being telescoped over said bearing sleeve and bearing engagement therewith.

3. In a magnetic tape recorder, the improvement claimed in claim 2, in which the axial spacing of said cutaway portion form said belt pulley is of the order of the axial length of the annular friction wheel.

4. In a magnetic tape recorder, the improvement claimed in claim 2, in which said cutaway portion is a cutaway segment having an angular extent in excess of 180° by an amount sufficient to completely expose the periphery of said torsion-resistant shaft.

5. In a magnetic tape recorder, the improvement claimed in claim 2, in which said belt pulley and said annular friction wheel constitute an integral one-piece structure.

6. In a magnetic tape recorder, the improvement claimed in claim 1, in which said bearing sleeve is mounted on said setting lever in spaced relation to the pivot axis of said setting lever.

7. In a magnetic tape recorder, the improvement claimed in claim 6, in which said bearing sleeve is secured to said setting lever to form a unit therewith.

* * * * *